United States Patent Office 3,351,174
Patented Nov. 7, 1967

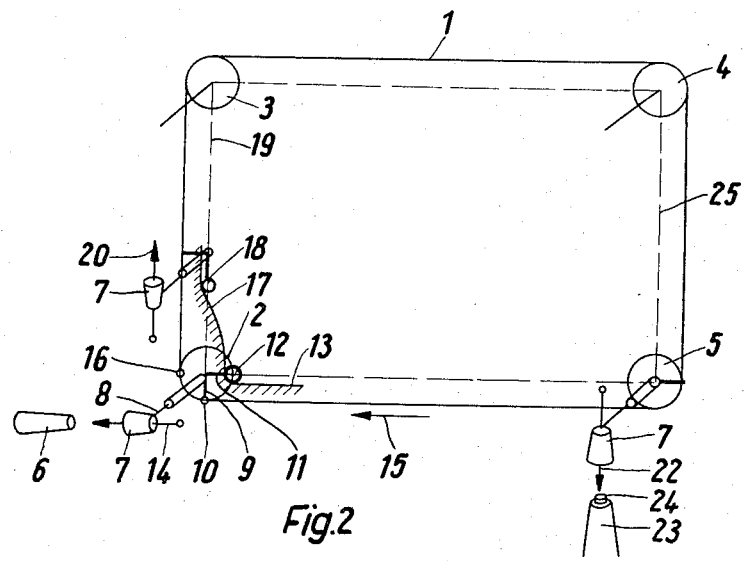
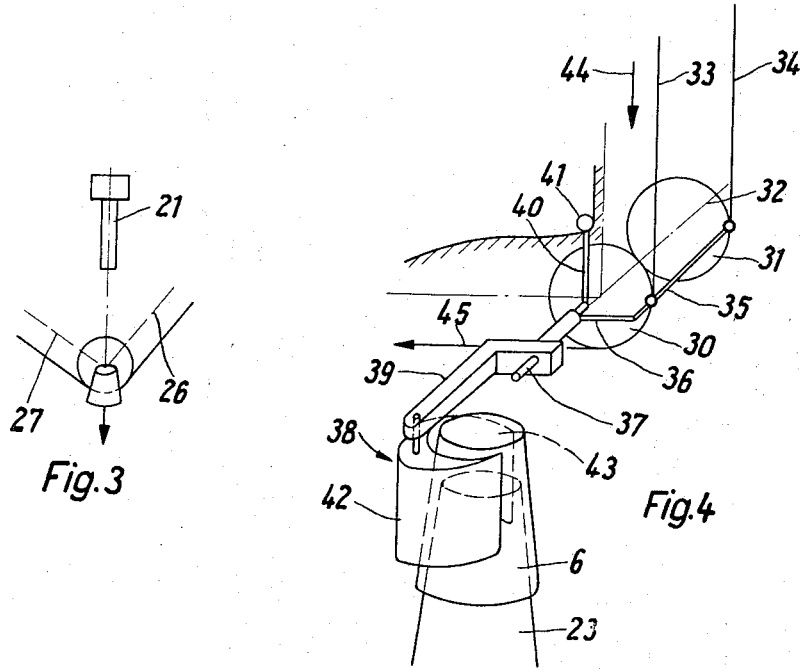

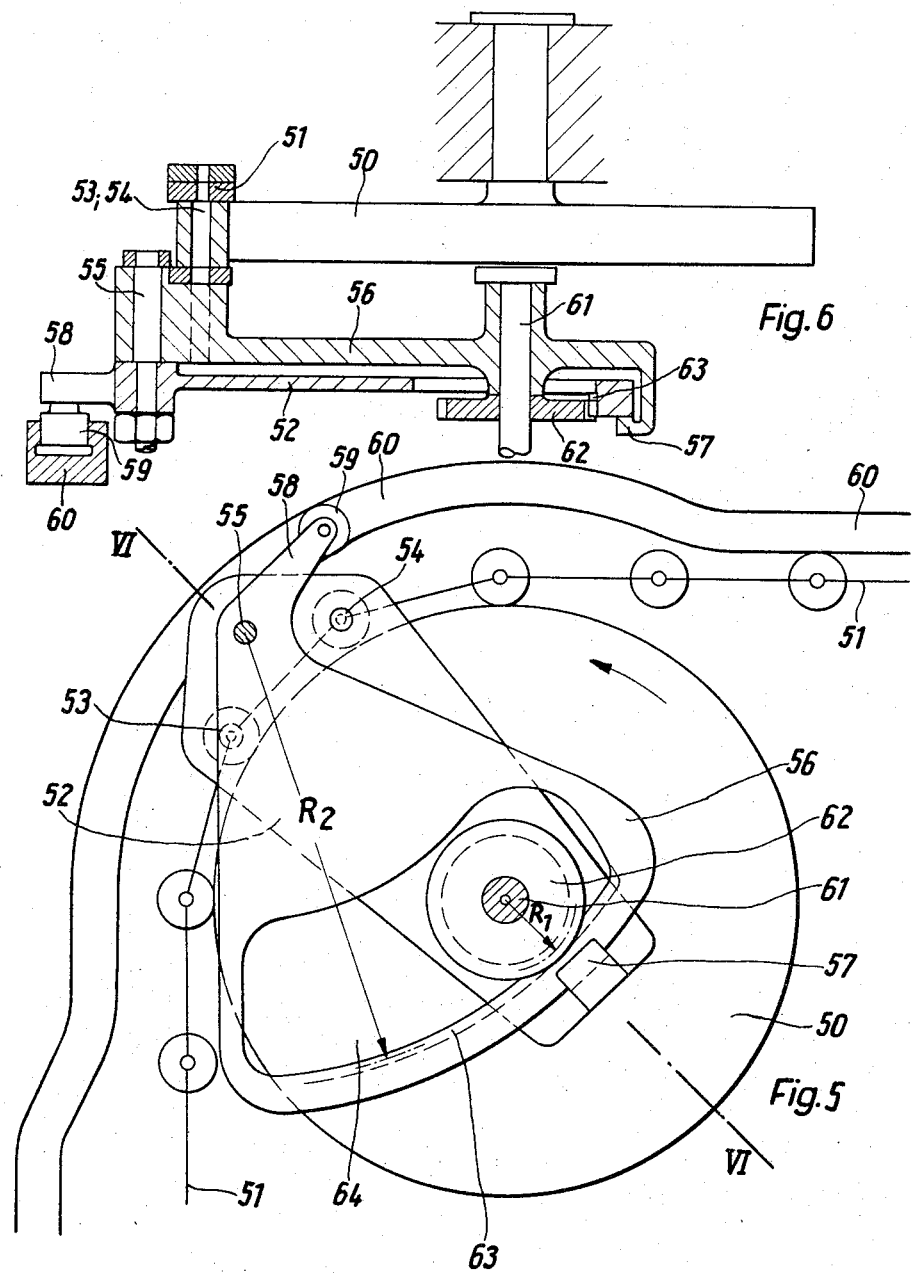

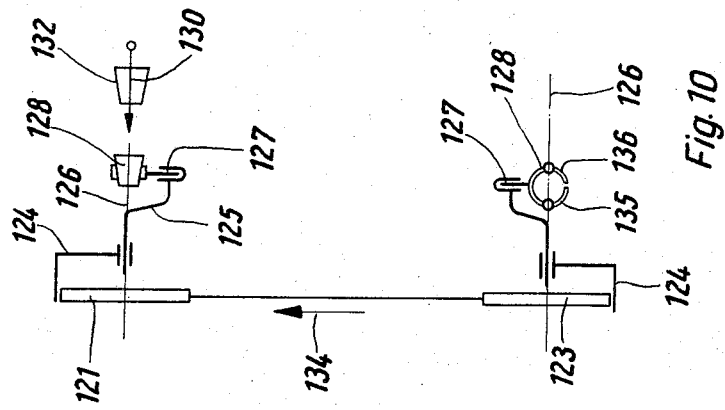
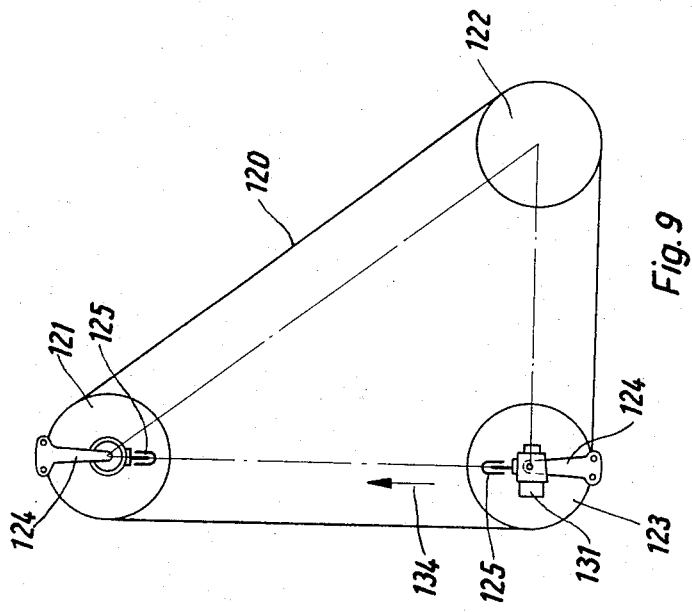

3,351,174
CONVEYOR FOR TRANSPORTING
WORKPIECES
Fritz Wommelsdorf and Werner Schmidt, Hamburg, Germany, assignors to Maschinenfabrik Rissen G.m.b.H., Hamburg-Rissen, Germany
Filed Aug. 15, 1966, Ser. No. 572,476
9 Claims. (Cl. 198—19)

ABSTRACT OF THE DISCLOSURE

A conveyor for workpiece such as paper cups comprising a continuously traveling chain having laterally projecting arms on which work holders are pivotally mounted. While a portion of the chain travels along a circular arc formed in its path, the respective holder either remains entirely stationary or, if desired, rotates around its center to facilitate performance of operational steps on a workpiece carried by the holder.

---

Figure 1:
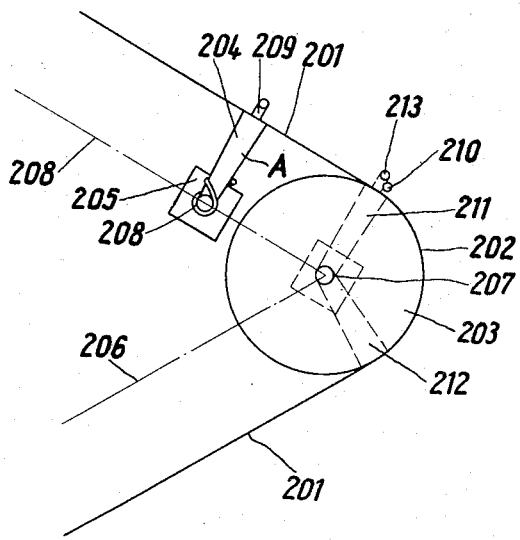

The present invention relates to conveyor means for machines for the processing of mass-production goods having workpiece holders seated laterally on holding arms on a continuously rotating chain, and which pass through centers of circular-arcuate curvatures of the chain path, the radius of which is equal to the distance between the centers of the holders and the path of the chain, in which connection during the stopping resulting therefrom of one holder in the center of curvature (dead center), operations can be carried out on the workpiece contained therein.

The holders which come into a dead center, i.e., in this case the center of curvature of the path of the chain, do not experience any motion of translation but, however, carry out a rotary movement with the holder arm the base of which passes through a circular arc with the chain. In many cases such a rotary movement is harmless, while in other cases it must be avoided.

The present invention provides a method of avoiding such a rotary motion and it consists in the fact that the holders are turnable at their holding arm which connects them with the chain around an axis which coincides with the axis of curvature or dead-center axis and a stop is provided which prevents the holder which is at the dead center from rotating.

The invention is of importance in particular when articles of non-circular cross-section are to be worked. In these cases it is generally also necessary that the workpiece assume a specific position with respect to the tool at the start of the operation. This result can be obtained in accordance with the present invention in the manner that there is provided between the holder and the holding arm a return spring which turns the holder back after it has been released into its initial position with respect to the holding arm. The holder in this way assumes a predetermined position upon entrance into any dead center or else into a rotary table which is combined with dead centers.

In many cases the direction of machining of the tool will agree with the direction of the axes of the so-called dead centers, since this arrangement is frequently very simple.

However, it has been found that considerable advantages can, on the other hand, be obtained if the stop which produces a rotary movement of the holder with respect to the holding arm is developed as a cam cooperating with a control arm of the holder and if the workpiece holders are arranged on their holding arms with their axial direction lying substantially parallel to the plane of rotation of the chain.

These advantages consist in particular in the fact that the designer is free to determine from which side of the dead center he wishes to have the machining take place. He is not forced to select for the tool the space, which is frequently, as it is, rather scarce, in the axial direction of the dead center. Another advantage is that the run-in and run-out movements of the holder or the workpiece in the dead center can be used for bringing the workpiece and holder closer together or further apart when, in accordance with another feature of the invention, the direction of the workpiece holder or of the workpiece, upon the running-in to a dead center or upon the running-out therefrom, agrees with the direction of machining. Thus, for instance, in connection with the working of paper cups, the cup which is to be flanged or beaded can, when running into the dead center, simultaneously come against the flanging tool.

Furthermore, the workpiece holder or the workpiece contained therein can have special laws of movement imposed upon it in the dead center with utilization of the movement of conveyance in that the fastening of the workpiece holders lies eccentrically to their axes of rotation which coincide from time to time with the dead center. In this connection, the cams are so developed that they impart to the workpiece holders, during the running-in to or out of the dead center, a rotation so as to bring same towards the tool or a movement away from it.

One of the simplest cases for the use of the conveying movement of the workpiece is the removing of paper cups and similar hollow bodies from the conveying device, the workpiece holders of which consist, in accordance with the invention, of flaps which are compressed in jaw-like fashion by spring pressure transversely to the workpiece axis; in this case the direction of run-in in one dead center in which the workpieces are to be discharged agrees with the longitudinal direction of a removing mandrel or the like which is held in the dead center during the running-in and the running-out direction agrees approximately with the direction of action of the jaw opening of the flaps but in the opposite direction. By the movement of conveyance of the paper cups alone, the cups are placed on the removing mandrel. No tools are necessary which push the paper cup out of the holder. Finally, the removing mandrel need not be removed during the stay of the workpiece holder in the dead center from the region of the latter with the paper cup which is to be discharged. Rather, the mutual loosening of workpiece holder and paper cup takes place in a very simple manner due to the fact that the holder, upon its running-out of the dead center, moves away from same transverse to the direction of the mandrel. In this connection, the jaw flaps of which the holder consists are opened automatically against spring force by the mandrel which has remained behind, whereby they discharge the cup which was previously held.

This idea can be varied in corresponding manner for workpieces of other shape, and in more complicated cases special control devices can be provided which open the holder in due time before the starting of the running-out from the dead center.

In such a relatively simple case, the means for the angular aligning of the holders in the dead center can consist of a spring which pulls the holder into the desired running-in direction against a stop. During the stay in the dead center, the holder is prevented from rotating by the mandrel. After the loosening of the mandrel, it snaps back into the initial position under the action of the spring. In many cases it will, however, be necessary that the holder assume in one dead center of the rotation a different direction than in another dead center. In accordance with another feature of the invention, the means for the angular alignment of the holders can consist of a cam which accompanies the chain path at least in the region of the dead center, a control arm cooperating with said cam, and a gearing which transmits the movement of the control arm to the swivel pin. Such a device can also carry out any desired movement controls upon the running-in or running-out of, for instance, an eccentrically arranged holder.

The control arm or lever can be pressed against a unilateral cam by spring force. It is more dependable to use a double-sided cam, i.e., a grooved cam, since one thereby becomes independent of any spring, which might possibly break; this would bring about an improper position of the holder upon the running in to a dead center and thus possibly have very serious consequences.

In connection with the rotatable holders of the present invention, a problem arises with respect to the supporting thereof on the holding arm, since, on the one hand, great dependability with respect to said support is required and since, on the other hand, the slightest possible axial construction length is required, so that the distance of the holders from the plane of rotation of the chains and from the rotating discs holding the chains be as small as possible, since, otherwise, the torque will become excessively large due to the forces directed perpendicular to the dead-center axes. This problem is solved, in accordance with the present invention, in the manner that the supporting of the holders on holding arms of flat development is effected via two thrust bearings, at least one of which has a diameter which is relatively large as compared with the holder, so that their axial spacing can be made very slight without impairing the quality of the bearing.

The possibility of utilizing the running-in and running-out movement of the holders into and out of the dead center, for instance, by the interposition of a gearing, for the bringing together or apart of the workpiece and the tool can be utilized to great advantage in the manner that the angle of rotation of the chain bearing the holding arms around such a dead center is made equal to 180°. This means that the direction of running in and of running out correspond in opposite directions.

In an apparatus for the introducing of paper cups into the holders rotating on a chain, the empty holders are aligned in the running-in direction upon its running into the dead center. In the dead center the cup which is to be received is held coaxially to the holder which runs-in, namely, at the place which the holder reaches when it stands still, so that solely on basis of its running-in motion it comes over the cup and thereafter holds it fast when, after a 180° rotation of its holding arm, it again moves out of the dead center together with the cup. Therefore no transfer movement of the tool holding the cup is necessary at all. The same system can be used in connection with other working processes which are based on a relative movement of translation back and forth between a workpiece and a tool.

Furthermore it is advantageous to vary the idea of maintaining the holders parallel to the plane of rotation of the chain by having the holders assume this parallel position only alternately with respect to other positions by having them swingable, aside from their rotatability with respect to the holding arm, around a pivot pin coinciding with the axis of the dead center on the holder connecting them with the holding arm around an axis which is transverse to the dead-center axis and transverse to their longitudinal axis, and having them provided with control members cooperating with cams for swinging or holding the holders in the intended positions of swing. In this way they can be inclined and so held in any desired direction; in particular, they can lie optionally in the direction of the dead-center axis or parallel to the plane of rotation.

Figure 7:
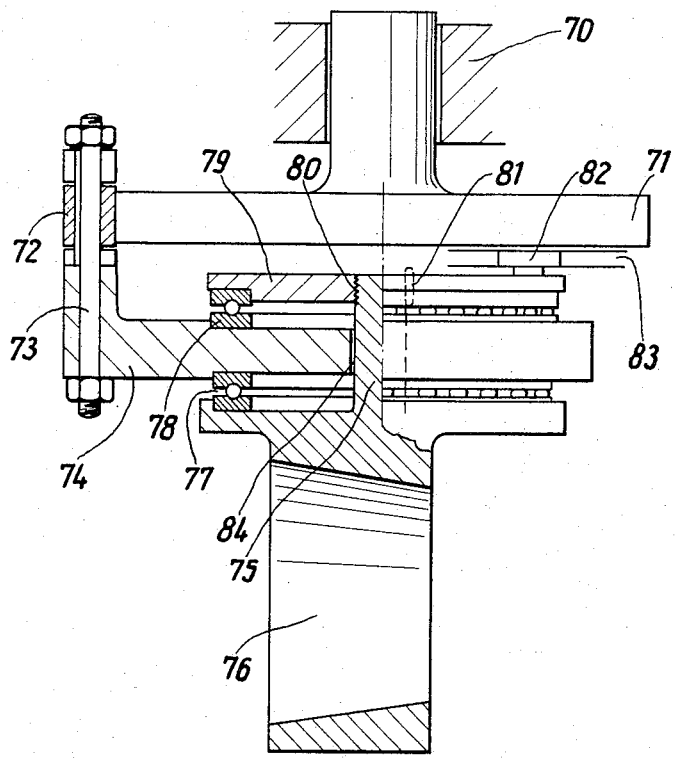
Figure 11:
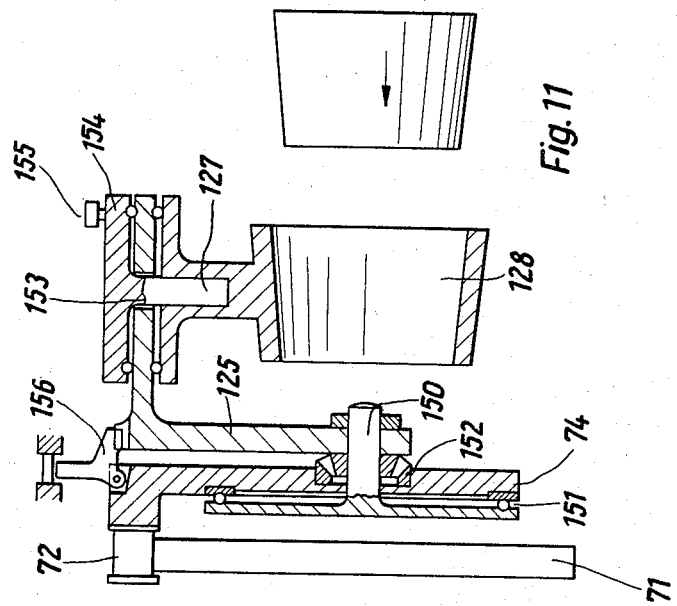
Figure 8:
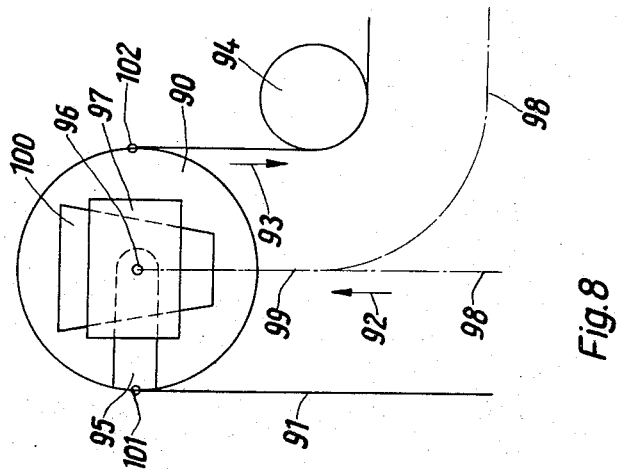

The invention will be described in further detail below with reference to the drawing in which illustrative embodiments and details thereof have been schematically shown. In the drawing:

FIG. 1 is a schematic view of a dead center;
FIG. 2 is a top view of a path of rotation with dead-center axes indicated in perspective;
FIG. 3 shows an individual dead center;
FIG. 4 shows a dead center serving to deliver paper cups;
FIG. 5 is a top view of the essential parts of a dead center with means for angular alignment and rotation of the holders;
FIG. 6 is a cross-section along the line V—V of FIG. 5;
FIG. 7 is a cross-section through an advantageous bearing construction in accordince with the invention;
FIG. 8 shows a dead center with an angle of rotation of 180°;
FIG. 9 is a top view of a rotating chain with three dead centers;
FIG. 10 is a side view thereof; and
FIG. 11 is a section through a construction of the holder mounting used, for instance, in connection with a device in accordance with FIGS. 9 and 10.

In FIG. 1, a chain 201 travels around a curved path 202 representing a circular arc which can be formed by a sprocket wheel 203. On the chain 201 there is arranged via holding arm 204 a holder 205 which, in the case shown, is square. The holding arm 204 and the chain 201 are connected with each other at one end of the arm as will be described in more detail in connection with FIG. 6, for example. The center of the holder 205 describes, during the travel of the chain 201, a path 206 which forms a sharp angle at the place 207. The point 207 is the standstill point or dead center of the system and likewise represents the center or the central axis of the circular arc 202.

The holder 205 is rotatably arranged on the holding arm 204, namely, for rotation around its pivotal or co-ordinated axis which coincides in the dead center 207 with the central axis of the arc and, thus, the axis of rotation of the chain. It will be apparent from the drawing that the pivotal axis of holder 205 is spaced from the path of chain 201 by a distance equal to the length of the radius of the circular arc 202.

The holder 205 has a lever 209 firmly secured thereto by which the holder is held fast in its initial position upon its running into the dead center position by means of a stationary abutment or stop 210 while the holding arm 204 passes out of the initial relative position 211 into the modified position 212.

Since the chain moves out from here at an acute angle to the preceding direction of travel, the lever 209, which, during the dead-center rotation of the holding arm, is in the position shown at 213, is pulled away from the stop 210, so that it—and together with it the holder 205—returns into its initial position under the action of a torsion spring 208 which is interposed between the holder 205 and the holding arm 204.

The further explanation of the invention will be given with reference to the example of a machine for the manufacture or working of paper cups. The chain 1 shown in FIG. 2 travels generally along a plane and contacts four dead centers 2, 3, 4 and 5. The paper-cup body 6 coming from a winder (not shown) is pushed at the dead center 2 into a stationary holder 7 having a correspondingly horizontal longitudinal axis substantially parallel to the plane of travel of chain 1. This holder has its pin 8 seated rotatably on the arm 9 which is fastened at 10 to the chain 1. To the rotatable pin 8 there is firmly connected a control arm 11 which bears a roller 12. During the running of the holder 7 into the dead center 2, the roller 12 travels along a cam 13 which is rigidly connected with the machine frame and is so dimensioned with respect to the control arm 11 and its direction with respect to the holder 7 that the direction of movement 14 of the holder 7, upon running into the dead center 2, agrees with its previous direction of conveyance 15. While the holding arm 9 on which the pin 8 is seated passes through the dead-center sector between the points 10 and 16, the roller 12 holds the pin 8 firm against the arm 11 so that the holder 7 cannot rotate, but remains stationary, until the cup body coming from a mandrel has been inserted into the holder. On the pin 8 and the arm 11 which is rigidly connected with the pin 8 a torsion spring (not shown in the drawing) acts in clockwise direction. During the running of the holder out of the dead center 2, the roller 12 of the arm 11 is thereby held against the curved piece or edge 17. This curved piece approaches the holder path 19 shown in dot-dash line, as a result of which the arm 11 has an opportunity during the running-out path to the resting point 18 of the roller 12 to turn to such an extent that the holder looks in the direction of the arrow 20, i.e., into the new direction of conveyance. By the specific development of the curve 13, the result can be obtained that the holder will at each dead center 2, 3, 4, or 5 assume that angular position which is deemed advisable for the specific operation to be effected. For example, the holder can be imparted in the dead center also a position in accordance with FIG. 3 as is best for the arrangement of the tool 21.

At the dead center 5 of FIG. 2 it is shown how the holder 7 arrives at the dead center 5 in such a manner that the cup body is pushed over the mandrel 23 which is directed in opposite direction to the prior direction of conveyance 22, said mandrel, for instance, bearing a bottom 24.

In the arrangement shown in the drawings, it would be somewhat difficult to bring the ejector into position, since it would have to operate in the direction along which the holder 7 has moved into the dead center 5. The ejection in itself would, however, be relatively simple as compared with known ejector devices in connection with which the axes of the holders coincide with the dead-center axes. The advantage is obtained here that the direction of working can be freely selected. In order for the ejector not to interfere with the path 25 of the holders, it is arranged, as shown in FIG. 3, between the running-in path 26 and the running-out path 27 of the holders.

The delivery of the paper cups is, however, effected in particularly simple manner with a device in accordance with FIG. 4. The sprocket wheels 30 and 31 travel on a common shaft 32. They correspond to the dead-center wheel 5 in the case of FIG. 2. Over them there travel the chains 33 and 34 which are connected by a bar 35 which in its turn bears the holding arm 36. It is provided with an eye for the supporting of the pivot pin 37 of the holder.

The pin 37 is extended towards the holder 38 by an intermediate member or arm 39. On the opposite side there is fastened to the pin 37 the lever 40 which on its end has the roller 41. This lever corresponds to the one indicated as 11 in FIG. 2.

The holder 38 consists of two flaps 42 and 43 pivotally attached to arm 39 at a point eccentric with respect to the axis of pin 37. In closed condition they form a holding body which is similar to that designated by the reference number 7 in FIG. 2, i.e., there is present a conical inner space into which the body of a paper cup can be inserted in the dead center 2 of FIG. 2 and held fast therein. The flaps are pressed together against a stop by spring force so that they form just the desired receiving space. They can open up in jaw-like fashion against the spring force.

When the chain 33, 34 moves in the direction of the arrow 44 to the dead center, the axes of the holder 38 and of the mandrel 23 agree precisely. The mandrel 23 is in this connection pushed so far into the dead-center region that the cup body is placed completely on the mandrel during the running into the dead center. When the dead center has been passed through, the chain moves further in the direction indicated by the arrow 45. The direction of action of the jaw opening of the flaps 42, 43 is opposite this direction, so that upon running out of the dead center they are simply pushed apart and leave the body of the cup 6 behind on the mandrel 23.

FIGS. 5 and 6 show a special embodiment for fixing the angle of rotation of the holder at the dead center. Around the dead-center wheel 50 there travels the chain 51 on which the holding arm 52 is seated. Fastening bolts or chain link points are indicated at 53 and 54. The holding arm bears a pin 55 around which a segment-like lever 56 is swingable. This lever is supported by a nose 57. The segment-like lever 56 has a lever continuation 58 with a cam follower roller 59 which travels in the cam 60 which is fastened to the machine frame. The lever 56, in a manner similar to that shown in the figures already described has a support for a pin 61 for the holder, which is not shown in FIGS. 5 and 6. On this pin there is firmly seated a pinion 62 which is in engagement with a toothed ledge 63 in a cutout 64 of the segment-like lever 56. A rotation of this segment-like lever is thus transmitted with a transmission ratio which can be arbitrarily selected in the ratio of the radii $R_2$ of the toothed ledge at the segment-like lever to $R_1$ of the pinion 62 to the holder pin 61. With such an arrangement, the holder can be turned to any desired angle. If there is selected, for instance, a ratio of $R_2$ to $R_1$ of 8 to 1, an angular deflection of the lever extension 58 of only 45° would be sufficient to turn the holder by 360°. This rotation can naturally also be used for working processes on the workpiece which is held in the holder.

In connection with the construction of the parts which connect the chain via the holding arm and the pin of the holder with the holder, it has been found particularly important to see to the slightest possible distance between the holder and the chain and/or the dead-center wheel. The greater this distance is, the greater also the torque exerted on the chain among those forces which act transversely to the dead-center axis. This is particularly important in cases in which the plane of rotation of the chain is vertical, so that the weight of the holder and the parts bearing it continuously exerts such a torque. The reduction to practice of the inventive concept therefore presupposes the finding of a construction which is satisfactory in this respect. FIG. 7 shows a construction which particularly satisfies the existing conditions. In the frame 70 there is supported the dead-center wheel 71 on which there rotates a chain whose roller is designated 72. The holding arm 74 is fastened to the chain by means of two screws 73. The pin 75 of the holder 76 is rotatably supported therein.

Although only a very short stub shaft 75 is supported in the holding arm 74, a very stable support is obtained by the fact that there are used two thrust bearings 76 and 78 which are of relatively large diameter approaching, or on the order of, the overall dimensions of the holder 76 as will be evident from FIG. 7. If these two thrust bearings do not have a sufficiently centering action, a special radial bearing can also be provided. The cover 79 holding the thrust bearing 78 is adjustable by means of a thread 80 which can be secured by means of a set screw 81.

On the cover 79 there is directly provided the roller 82 which, by guidance in a curve (cam) 83 which is fastened to the frame, effects the controlling of the rotation of the holder. A special lever can thus be dispensed with if small deflections are sufficient.

A further shortening can be obtained if, instead of the large thrust bearing 78, there is used a thrust bearing of smaller diameter which can be arranged in the space 84 in which the stub shaft 78 passes through the holding arm.

FIG. 8 shows a dead center with dead-center disc 90 which is rotated by the chain 91 in an angle of 180°. It is assumed that it runs-in in the direction of the arrow 92 and leaves the dead center again in the direction of the arrow 93 and thereupon is curved in opposite direction by the guide wheel 94.

On the chain there is seated, in a manner which has already been described in detail, a holding arm 95 with the holder 97 supported thereon for rotation about the pin 96. The center point 96 of this holder during the running into and out of the dead center, describes the path 98 indicated in dot-dash line. In the region 99 of this path the direction of running-in and the direction of running-out agree in opposite directions with each other.

If now, for instance, in the dead center shown in the drawing, the feeding of cups 100 into the holders 97 is to take place, one proceeds in the manner that the cup which is to be transferred into a holder is held in the position indicated, while the holder travels into the dead center. When it has reached the standstill position shown in the drawing, it surrounds the cup 100 and holds it fast without any additional movement of the mandrel holding the cup being required for this. When the holding arm 95 has passed through the angle of rotation of 180°, namely, the region between the points 101 and 102, the holder moves back along the path 99, carrying the cup with it.

Such an arrangement could also be used for other processing operations, for instance, for the beading of the lip of a cup. The holder in this connection enters in the same position with the cup into the dead center where a fixed beading tool is located. The relative motion between workpiece and tool required for the operation is in this connection established by the conveyor movement along the path 99.

This arrangement is particularly suitable for cases in which large relative movements between workpiece and tool are necessary, where, for instance, a mandrel must penetrate into the full length of a paper cup which is held in the holder.

FIGS. 9, 10 and 11 have an internal relationship to each other insofar as they show the swingability of the holder around an axis of swing which is perpendicular to the holder's longitudinal axis and thus to the axis of the dead center and show the application of this feature.

In FIG. 9 there is shown a chain rotation in which the chain 120 is guided around three dead centers with dead-center discs 121, 122 and 123. FIG. 10 is a side view of this arrangement with the dead-center discs 123 and 121. On the chain there are arranged holding arms 124 on which holder mounts 125 are rotatably supported about a swivel pin 126 which coincides with the dead-center axes. They bear, swingable about the axis 127 which is perpendicular to the axis 126, the holder 128 which can thus be adjusted coaxially to the dead-center axis (FIG. 10, top) or perpendicularly thereto (FIG. 10, bottom). There are present here means (not shown in detail) which control the specific position of the holder. These means can be essentially similar to those which have been shown and described above for the rotational control of the holders with respect to the holding arms. They may, for instance, be stationary cams in combination with control levers traveling in said cams and connected with the holders.

The arrangement shown in FIGS. 9 and 10 is intended to serve for the transfer of paper cups from cups fed in the direction of the arrow 130 in the dead center 121 to a mandrel 131 provided at the dead center 123. The direction of feed and the direction of discharge are in this connection not parallel. The plane of rotation is perpendicular to the direction of feed 130 and the mandrel 131 lies in this plane. This transfer problem is solved in the manner that the holder 128 is adjusted at the dead center 121 coaxially to the dead-center axis and in this position receives the paper cup 132 arriving in the direction indicated by the arrow 130, while the holder 128, before running into the dead center 123, turns into a position in which it is coaxial to the mandrel 131. In this position it travels with the cup 132 onto the mandrel 131 and thereafter moves further in the direction indicated by the arrow 134. In this connection, in the embodiment shown in FIG. 4, it consists of spring clamps 135 and 136 which, upon the running-out from the dead center 123, becomes loose from the cup 132 and the mandrel 131 without the latter having to be removed from the dead-center region.

A construction of the holding members for the holder which can be used, for instance, in such cases is shown in FIG. 11. In this figure, the parts 71 (dead-center wheel), 72 (sprocket wheel) and 74 (holding arm) correspond to those of FIG. 7. The pin 150 is supported in the holding arm via the thrust bearing 151 of large diameter and the tapered roller bearing 152 and fastened in the holder mount 125. The holder 128 is rotatably supported on the holder mount 125 around the pin 127. The support 153 corresponds to that explained in connection with FIG. 7. The cover 154 bears in this connection the roller 155 which, corresponding to the roller 82 of FIG. 7, travels in a stationary guide and effects the rotary control of the holder 128.

In order to fix in position the parts 74/125 and 125/128 respectively which are rotatable with respect to each other, there are provided pawl means 155 by which the corresponding parts can be locked with respect to each other.

What is claimed is:

1. A conveyor for transporting workpieces subjected to operational steps during mass-production, comprising a chain continuously traveling along a path including at least one circular arc having a radius of predetermined length and a central axis positioned laterally of said path at one side thereof, at least one arm mounted at one of its ends on said chain and projecting laterally therefrom at said one side of the path, a workpiece holder turnable on said arm about a pivotal axis spaced from said path of the chain by a distance equal to the length of said radius of the circular arc so that said central and pivotal axes will coincide during travel of said one end of the arm connected to said chain along said circular arc, and control means for regulating movement of said workpiece holder about said pivotal axis in the region of said circular arc to facilitate performance of said operational steps, said control means including stop means for releasable engagement with said workpiece holder to prevent said holder temporarily from rotating about said pivotal axis while permitting rotation of said arm about said pivotal axis from an initial relative position of said arm and holder to a modified relative position.

2. A conveyor as specified in claim 1, including resilient means engaging said workpiece holder and said arm for returning said holder to said initial relative position of arm and holder upon release of said holder from engagement with said stop means.

3. A conveyor as specified in claim 1, wherein said stop means comprises a stationary abutment and said holder has a lever firmly secured thereto for engagement with said abutment.

4. A conveyor for transporting workpieces subjected to operational steps during mass-production, comprising a chain continuously traveling along a path including at least one circular arc having a radius of predetermined length and a central axis positioned laterally of said path at one side thereof, at least one arm mounted at one of its ends on said chain and projecting laterally therefrom at said one side of the path, a workpiece holder turnable on said arm about a pivotal axis spaced from said path of the chain by a distance equal to the length of said radius of the circular arc so that said central and pivotal axes will coincide during travel of said one end of the arm connected to said chain along said circular arc, and control means for regulating movement of said workpiece holder about said pivotal axis in the region of said circular arc to facilitate performance of said operational steps, said control means including stationary cam means, and follower means connected to said workpiece holder, and said path of the chain being generally disposed in a plane and said workpiece holder having a longitudinal axis disposed substantially parallel to said plane of the path of the chain.

5. A conveyor as specified in claim 4, wherein said cam means has a curved edge and said follower means engages said edge under resilient pressure.

6. A conveyor as specified in claim 4, wherein at least one of said operational steps is performed in a predetermined direction and said cam means and follower means are effective to position said workpiece holder with its longitudinal axis aligned with said predetermined direction for performing said one operational step.

7. A conveyor for transporting workpieces subjected to operational steps during mass-production, comprising a chain continuously traveling along a path including at least one circular arc having a radius of predetermined length and a central axis positioned laterally of said path at one side thereof, at least one arm mounted at one of its ends on said chain and projecting laterally therefrom at said one side of the path, a workpiece holder turnable on said arm about a pivotal axis spaced from said path of the chain by a distance equal to the length of said radius of the circular arc so that said central and pivotal axes will coincide when said one end of the arm connected to said chain travels along said circular arc, cam means extending along said path of the chain at least in the region of coincidence of said central and pivotal axes, a control lever movably mounted on said arm, follower means connected to said control lever and engaging said cam means for causing movement of said control lever in accordance with the shape of said cam means, and gearing operatively connecting said control lever and said workpiece holder so that upon said movement of the control lever said holder will be turned about its pivotal axis in accordance with the transmission ratio of said gearing to facilitate performance of said operational steps.

8. A conveyor as specified in claim 7, wherein said cam means has a groove to guide said follower means.

9. A conveyor for transporting workpieces subjected to operational steps during mass-production, comprising a chain continuously traveling along a path including at least one circular arc having a radius of predetermined length and a central axis positioned laterally of said path at one side thereof, at least one arm mounted at one of its ends on said chain and projecting laterally therefrom at said one side of the path, a mount turnable on said arm about a first pivotal axis spaced from said path of the chain by a distance equal to the length of said radius of the circular arc so that said central and first pivotal axes will coincide during travel of said one end of the arm along said circular arc, a work holder having a longitudinal axis and being swingable on said mount about a second pivotal axis extending transversely to said central axis and to said longitudinal axis, first control means for regulating movement of said mount with said work holder thereon about said first pivotal axis, and second control means for determining movement of said work holder about said second pivotal axis, said first and second control means being effective to adjust the position of said work holder so as to facilitate performance of said operational steps in the region of said circular arc.

References Cited
UNITED STATES PATENTS 3,256,970    6/1966    Fievet _____ 198—19

EVON C. BLUNK, *Primary Examiner.*

M. L. AJEMAN, *Assistant Examiner.*